United States Patent
Roscoe et al.

(10) Patent No.: US 12,406,040 B2
(45) Date of Patent: Sep. 2, 2025

(54) SECURE AUTHENTICATION TOKEN

(71) Applicant: BRITISH TELECOMMUNICATIONS PUBLIC LIMITED COMPANY, London (GB)

(72) Inventors: Jonathan Roscoe, London (GB); Max Smith-Creasey, London (GB); Tiago Martins Andrade, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/848,706

(22) PCT Filed: Feb. 27, 2023

(86) PCT No.: PCT/EP2023/054797
§ 371 (c)(1),
(2) Date: Sep. 19, 2024

(87) PCT Pub. No.: WO2023/180013
PCT Pub. Date: Sep. 28, 2023

(65) Prior Publication Data
US 2025/0111019 A1    Apr. 3, 2025

(30) Foreign Application Priority Data
Mar. 23, 2022 (GB) .................. 2204096

(51) Int. Cl.
*G06F 21/31* (2013.01)

(52) U.S. Cl.
CPC ................... *G06F 21/31* (2013.01)

(58) Field of Classification Search
CPC .......... G06F 21/31; G06F 21/32; G06F 21/36; G06F 3/04883; G06F 3/017
See application file for complete search history.

(56) References Cited

U.S. PATENT DOCUMENTS

| | | | |
|---|---|---|---|
| 8,539,550 B1 * | 9/2013 | Terres | G06F 21/31 726/16 |
| 8,638,939 B1 | 1/2014 | Casey et al. | |

(Continued)

FOREIGN PATENT DOCUMENTS

| | | |
|---|---|---|
| CN | 103034429 A | 4/2013 |
| CN | 103838499 A | 6/2014 |

(Continued)

OTHER PUBLICATIONS

International Search Report and Written Opinion of the ISA for PCT/EP2023/054797, mailed May 15, 2023, 17 pages.

(Continued)

*Primary Examiner* — Aravind K Moorthy
(74) *Attorney, Agent, or Firm* — Nixon & Vanderhye P.C.

(57) ABSTRACT

A method, computer system and non-transitory computer-readable storage medium are provided for validating a secure authentication token for accessing an application. The method captures a user gesture provided by a user as an authentication token and analyzes the gesture to evaluate a measure of complexity of the gesture. Responsive to a determination that the measure of complexity does not meet a minimum measure of complexity, repeating the capturing and analyzing steps until the gesture meets the defined measure of complexity. Then the user is requested to repeat the approved gesture and the repeated gesture is captured, and it is determined if the repeated gesture meets defined requirements for repeatability. Responsive to a determination that the repeated gesture does not meet the requirements for repeatability, the method is repeated; and, responsive to a determination that the repeated gesture does meet the requirements for repeatability, the gesture is validated as a secure authentication token.

21 Claims, 3 Drawing Sheets

Unsecure ←——————— Complexity ——————→ Secure
High-repeatability                            Low-repeatability
Memorable                                     Difficult to remember

(56) References Cited

U.S. PATENT DOCUMENTS

| | | | |
|---|---|---|---|
| 8,756,499 B1* | 6/2014 | Kataoka | G06F 40/274 715/259 |
| 9,165,159 B1* | 10/2015 | McDonnell | G06F 21/31 |
| 9,178,876 B1* | 11/2015 | Johansson | G06F 21/00 |
| 9,274,607 B2 | 3/2016 | Delean | |
| 9,361,447 B1 | 6/2016 | Bowers | |
| 9,424,416 B1* | 8/2016 | Choudhary | G06F 21/44 |
| 9,632,574 B2* | 4/2017 | Guerrero | G06F 21/31 |
| 9,648,011 B1* | 5/2017 | Mattsson | H04L 9/3226 |
| 9,690,929 B2* | 6/2017 | Selander | G06F 21/36 |
| 9,778,813 B2* | 10/2017 | Shenfield | G06F 3/04815 |
| 9,923,927 B1* | 3/2018 | McClintock | H04L 63/0846 |
| 10,007,779 B1* | 6/2018 | McClintock | G06F 21/31 |
| 10,068,086 B2* | 9/2018 | Andreeva | G06F 21/46 |
| 10,114,942 B2* | 10/2018 | Jakobsson | G06F 9/454 |
| 10,114,943 B1* | 10/2018 | Shitrit | H04L 63/0876 |
| 10,331,879 B1* | 6/2019 | Jiang | H04L 63/083 |
| 10,423,775 B1* | 9/2019 | Kane-Parry | G06F 21/46 |
| 10,429,943 B2 | 10/2019 | Horowitz et al. | |
| 10,445,733 B1* | 10/2019 | Wurmfeld | G06F 3/04883 |
| 10,540,491 B1 | 1/2020 | Martinez et al. | |
| 10,587,594 B1* | 3/2020 | McClintock | H04L 63/08 |
| 10,733,275 B1* | 8/2020 | Knas | G06V 40/18 |
| 10,757,095 B1* | 8/2020 | Atchity | H04L 9/0897 |
| 10,797,870 B1* | 10/2020 | Nguyen-Huu | H04L 9/0861 |
| 11,030,565 B1* | 6/2021 | Haberer | G06F 11/3672 |
| 11,099,731 B1* | 8/2021 | Everette | G06F 3/0488 |
| 11,227,060 B1* | 1/2022 | John | G06F 21/606 |
| 11,537,706 B1* | 12/2022 | Sharifi Mehr | G06F 21/33 |
| 11,662,894 B1* | 5/2023 | Kuneva | G06Q 30/0601 705/72 |
| 11,663,302 B1* | 5/2023 | Gershon | G06F 21/36 726/19 |
| 2004/0177272 A1* | 9/2004 | Walters | G06F 21/46 713/183 |
| 2007/0050850 A1* | 3/2007 | Katoh | H04L 63/105 726/1 |
| 2007/0300307 A1* | 12/2007 | Duncan | G06F 21/31 726/27 |
| 2008/0317335 A1* | 12/2008 | Chang | G06F 21/31 382/159 |
| 2009/0158406 A1* | 6/2009 | Jancula | G06F 21/46 726/5 |
| 2010/0031343 A1* | 2/2010 | Childress | G06F 21/46 726/18 |
| 2011/0247067 A1* | 10/2011 | Hirose | G06F 21/36 726/19 |
| 2012/0066650 A1* | 3/2012 | Tirpak | G06F 21/36 715/863 |
| 2012/0174213 A1 | 7/2012 | Geiger | |
| 2012/0246737 A1* | 9/2012 | Paxton | G06F 16/24578 726/27 |
| 2013/0002799 A1* | 1/2013 | Mock | H04N 7/142 348/E7.083 |
| 2013/0024932 A1* | 1/2013 | Toebes | H04W 12/08 726/19 |
| 2013/0055379 A1* | 2/2013 | Adams | H04L 9/088 726/18 |
| 2013/0086666 A1* | 4/2013 | Cheng | G06F 21/32 726/5 |
| 2013/0104089 A1* | 4/2013 | Rieffel | G06F 3/017 715/863 |
| 2013/0111580 A1 | 5/2013 | Checco | |
| 2013/0275309 A1* | 10/2013 | Kwong | G06Q 20/4012 348/78 |
| 2013/0305352 A1* | 11/2013 | Narendra | H04M 1/673 726/19 |
| 2014/0009421 A1* | 1/2014 | Lee | G06F 3/04883 345/173 |
| 2014/0043243 A1* | 2/2014 | Methenitis | H04W 12/06 345/173 |
| 2014/0059674 A1* | 2/2014 | Sun | G06F 21/44 726/19 |
| 2014/0109010 A1* | 4/2014 | Casey | G06F 3/04883 715/835 |
| 2014/0109220 A1* | 4/2014 | Inkumsah | G06F 21/316 726/19 |
| 2014/0123258 A1* | 5/2014 | Guerrero | G06F 3/01 726/7 |
| 2014/0143856 A1* | 5/2014 | Wu | H04W 12/065 726/16 |
| 2014/0143859 A1* | 5/2014 | Linge | G06F 21/36 726/19 |
| 2014/0258706 A1* | 9/2014 | Hrybyk | G06F 21/31 713/150 |
| 2014/0258942 A1* | 9/2014 | Kutliroff | G06F 3/0488 715/863 |
| 2014/0267009 A1* | 9/2014 | DeLean | G06V 40/28 345/156 |
| 2014/0282973 A1* | 9/2014 | Langley | G06F 21/36 726/7 |
| 2014/0298672 A1* | 10/2014 | Straker | G06F 3/04883 34/175 |
| 2014/0310764 A1* | 10/2014 | Tippett | G06F 21/31 726/1 |
| 2014/0361982 A1* | 12/2014 | Shaffer | G06F 3/017 345/156 |
| 2014/0365883 A1* | 12/2014 | Ramsay | G06F 21/70 715/702 |
| 2014/0373132 A1* | 12/2014 | Basmov | G06F 21/31 726/19 |
| 2015/0022490 A1* | 1/2015 | Heim | G06F 3/017 345/174 |
| 2015/0033194 A1* | 1/2015 | Schillings | G06F 3/017 715/863 |
| 2015/0054748 A1* | 2/2015 | Mason | G06F 3/017 345/168 |
| 2015/0067320 A1* | 3/2015 | Chatterton | G06F 21/316 713/100 |
| 2015/0084859 A1* | 3/2015 | Itzhaik | G06F 3/017 382/103 |
| 2015/0089635 A1* | 3/2015 | Alpert | G06F 21/32 726/19 |
| 2015/0154394 A1* | 6/2015 | Kapinos | G06F 21/31 726/19 |
| 2015/0229632 A1* | 8/2015 | Lee | G06F 21/46 726/4 |
| 2015/0242605 A1* | 8/2015 | Du | G06F 21/32 726/7 |
| 2015/0278492 A1* | 10/2015 | Tungare | G06F 21/36 726/19 |
| 2015/0294096 A1* | 10/2015 | Grigg | H04L 63/08 726/5 |
| 2015/0302217 A1* | 10/2015 | Liu | G06F 21/316 726/30 |
| 2015/0347725 A1* | 12/2015 | Ben Ari | G06F 21/31 726/19 |
| 2016/0026779 A1* | 1/2016 | Grigg | H04W 12/68 726/4 |
| 2016/0132673 A1* | 5/2016 | Birk | G06F 21/30 726/19 |
| 2016/0291697 A1* | 10/2016 | Jules | G06F 21/31 |
| 2016/0292413 A1* | 10/2016 | Williams | G06F 21/31 |
| 2016/0294802 A1* | 10/2016 | Xiao | H04L 9/3226 |
| 2017/0083693 A1* | 3/2017 | Bengtsson | G06F 21/32 |
| 2017/0097413 A1 | 4/2017 | Gillian et al. | |
| 2017/0111337 A1* | 4/2017 | Saboori | H04L 63/08 |
| 2017/0124328 A1* | 5/2017 | Krishnapura | G06F 21/32 |
| 2017/0169199 A1* | 6/2017 | Clarke | G06F 3/038 |
| 2017/0177851 A1* | 6/2017 | Sawant | G06F 21/36 |
| 2017/0180339 A1* | 6/2017 | Cheng | G06F 21/31 |
| 2017/0200046 A1* | 7/2017 | Bang | H04L 63/0861 |
| 2017/0212597 A1* | 7/2017 | Mishra | G06V 40/28 |
| 2017/0249003 A1* | 8/2017 | Nonogaki | G06F 1/325 |
| 2017/0293423 A1 | 10/2017 | Zhu | |
| 2017/0300159 A1* | 10/2017 | Akiyoshi | G06F 3/04886 |
| 2017/0310673 A1* | 10/2017 | Li | H04L 63/08 |
| 2017/0351370 A1* | 12/2017 | Oh | G06F 21/31 |
| 2018/0011544 A1 | 1/2018 | Franklin | |
| 2018/0012014 A1* | 1/2018 | Sahin | G06F 21/577 |

(56) References Cited

U.S. PATENT DOCUMENTS

| | | | |
|---|---|---|---|
| 2018/0041499 A1* | 2/2018 | Rathineswaran | G06F 21/46 |
| 2018/0060564 A1* | 3/2018 | Shapiro | G06F 21/31 |
| 2018/0096319 A1* | 4/2018 | Aggarwal | G06Q 20/403 |
| 2018/0107833 A1* | 4/2018 | Gadepalli | G06F 21/316 |
| 2018/0164995 A1* | 6/2018 | Czupi | G06F 3/0486 |
| 2018/0181741 A1* | 6/2018 | Whaley | G06F 21/32 |
| 2018/0211045 A1* | 7/2018 | Abukhovsky | G06F 21/577 |
| 2018/0232136 A1* | 8/2018 | Sparandara | G06F 3/04886 |
| 2018/0285548 A1* | 10/2018 | Hamlin | G06F 21/31 |
| 2018/0288026 A1* | 10/2018 | Callaghan | H04L 9/3226 |
| 2018/0349582 A1* | 12/2018 | Kline | H04L 63/083 |
| 2018/0367665 A1* | 12/2018 | Guisti | H04M 1/72463 |
| 2019/0104156 A1* | 4/2019 | Barkovic | G06F 11/3006 |
| 2019/0138708 A1* | 5/2019 | Agrawal | H04L 63/083 |
| 2019/0147152 A1* | 5/2019 | Kurian | G06F 21/32 382/118 |
| 2019/0311240 A1* | 10/2019 | Wicker | G07D 7/202 |
| 2019/0342252 A1* | 11/2019 | Dascola | H04M 1/72484 |
| 2019/0342324 A1* | 11/2019 | Nawy | G06F 16/2228 |
| 2019/0342329 A1* | 11/2019 | Turgeman | G06F 3/0488 |
| 2019/0370549 A1* | 12/2019 | Lai | G06F 3/017 |
| 2019/0392122 A1* | 12/2019 | Foster | G06F 21/6245 |
| 2020/0014542 A1* | 1/2020 | McIver | H04L 63/126 |
| 2020/0028679 A1* | 1/2020 | Chumbley | H04L 9/0894 |
| 2020/0034525 A1* | 1/2020 | Yoo | G06F 3/04883 |
| 2020/0042694 A1* | 2/2020 | Karpovsky | G06Q 10/06 |
| 2020/0112585 A1* | 4/2020 | Keohane | G06F 21/316 |
| 2020/0160458 A1* | 5/2020 | Bodin | G06F 40/30 |
| 2020/0201443 A1* | 6/2020 | Huang | G06N 20/20 |
| 2020/0242220 A1* | 7/2020 | Diato | G06F 21/32 |
| 2020/0275271 A1* | 8/2020 | Saripalle | H04W 12/065 |
| 2020/0311250 A1* | 10/2020 | Sandstrom | G06F 21/36 |
| 2020/0382491 A1* | 12/2020 | Kursun | H04L 63/1425 |
| 2020/0387594 A1* | 12/2020 | Sandstrom | G06F 21/316 |
| 2021/0055827 A1* | 2/2021 | Huang | H04W 12/069 |
| 2021/0089639 A1 | 3/2021 | Remillet et al. | |
| 2021/0103031 A1* | 4/2021 | Cohen | G01S 7/417 |
| 2021/0134110 A1* | 5/2021 | Irwin, Jr. | G06F 21/31 |
| 2021/0224375 A1* | 7/2021 | Fong | G06F 21/44 |
| 2021/0264002 A1* | 8/2021 | Gras | G07C 9/32 |
| 2021/0279324 A1* | 9/2021 | Orozco Cervantes | H04L 9/3226 |
| 2021/0333987 A1* | 10/2021 | Roedel | G06F 3/04883 |
| 2021/0342008 A1* | 11/2021 | Sachidanandam | G06F 3/0346 |
| 2021/0357034 A1* | 11/2021 | Trinh | G06F 3/04883 |
| 2021/0406376 A1* | 12/2021 | Sayapin | G06F 21/572 |
| 2022/0050894 A1* | 2/2022 | Miracolo | G06N 20/00 |
| 2022/0100280 A1* | 3/2022 | Nocon | G06V 40/28 |
| 2022/0141029 A1* | 5/2022 | Dahmen | H04L 9/3231 713/176 |
| 2022/0221932 A1* | 7/2022 | Bathiche | G06V 10/454 |
| 2022/0237271 A1* | 7/2022 | Patel | G06F 21/35 |
| 2022/0286460 A1* | 9/2022 | Donovan | H04L 63/20 |
| 2022/0342482 A1* | 10/2022 | Lock | G06T 13/80 |
| 2022/0391491 A1* | 12/2022 | Gross | G06F 21/46 |
| 2023/0129746 A1* | 4/2023 | Hakimi | G16H 10/20 705/2 |
| 2023/0136344 A1* | 5/2023 | Balaji | H04L 12/1818 348/14.08 |
| 2023/0209345 A1* | 6/2023 | Moon | H04L 12/28 726/4 |

FOREIGN PATENT DOCUMENTS

| | | |
|---|---|---|
| CN | 103886244 A | 6/2014 |
| CN | 105706100 A | 6/2016 |
| CN | 105786375 A | 7/2016 |
| WO | 2012104312 A1 | 8/2012 |
| WO | 2018196183 A1 | 11/2018 |

OTHER PUBLICATIONS

International Search Report and Written Opinion of the ISA for PCT/EP2023/054795, mailed May 15, 2023, 15 pages.

International Preliminary Report on Patentability for PCT/EP2023/054797, mailed Sep. 7, 2023, 17 pages.

International Preliminary Report on Patentability for PCT/EP2023/054795, mailed Sep. 4, 2023, 8 pages.

Combined Search and Examination Report for GB 2204096.8, dated Nov. 15, 2022, 13 pages.

Combined Search and Examination Report for GB 2204090.1, dated Nov. 29, 2022, 11 pages.

Eunyong Cheon et al., "Gesture Authentication for Smartphones: Evaluation of Gesture password Selection Policies", IEEE Symposium on Security and Privacy, 2020, pp. 249-267.

Jing Tian, "Authenticating Users with 3D Passwords Captured by Motion Sensors", Scholar Commons, Theses and Dissertations, University of South Carolina, Doctoral dissertation, 2018, 153 pages, retrieved from https://scholarcommons.sc.edu/etd/4593.

Xuan Wang et al., "GesID: 3D Gesture Authentication Based on Depth Camera and One-Class Classification", Sensors, vol. 18, No. 3265, 2018, 23 pages.

Saiwen Wang et al., "Interacting with Soli: Exploring Fine-Grained Dynamic Gesture Recognition in the Radio-Frequency Spectrum", User Interface Software and Technology (UIST), Oct. 2016, pp. 851-860.

Office Action dated Jan. 29, 2025, 20170293423 issued for U.S. Appl. No. 18/849,353 (16 pages).

U.S. Appl. No. 18/849,353 to Tiago Martins Andrade, filed Sep. 20, 2024 (21 pages).

Tiago Andrade et al., "Discerning User Activity in Extended Reality Through Side-Channel Accelerometer Observations", IEEE Conference Publication, IEEE Xplore, 9, Nov. 10, 2020.

Translation of First Notification of Office Action dated Apr. 12, 2025 issued for Chinese Application No. 202380029091.9 (11 pages).

Office Action dated Jun. 7, 2025 issued for Chinese Application No. 202380028639.8 (8 pages) and Translation.

* cited by examiner

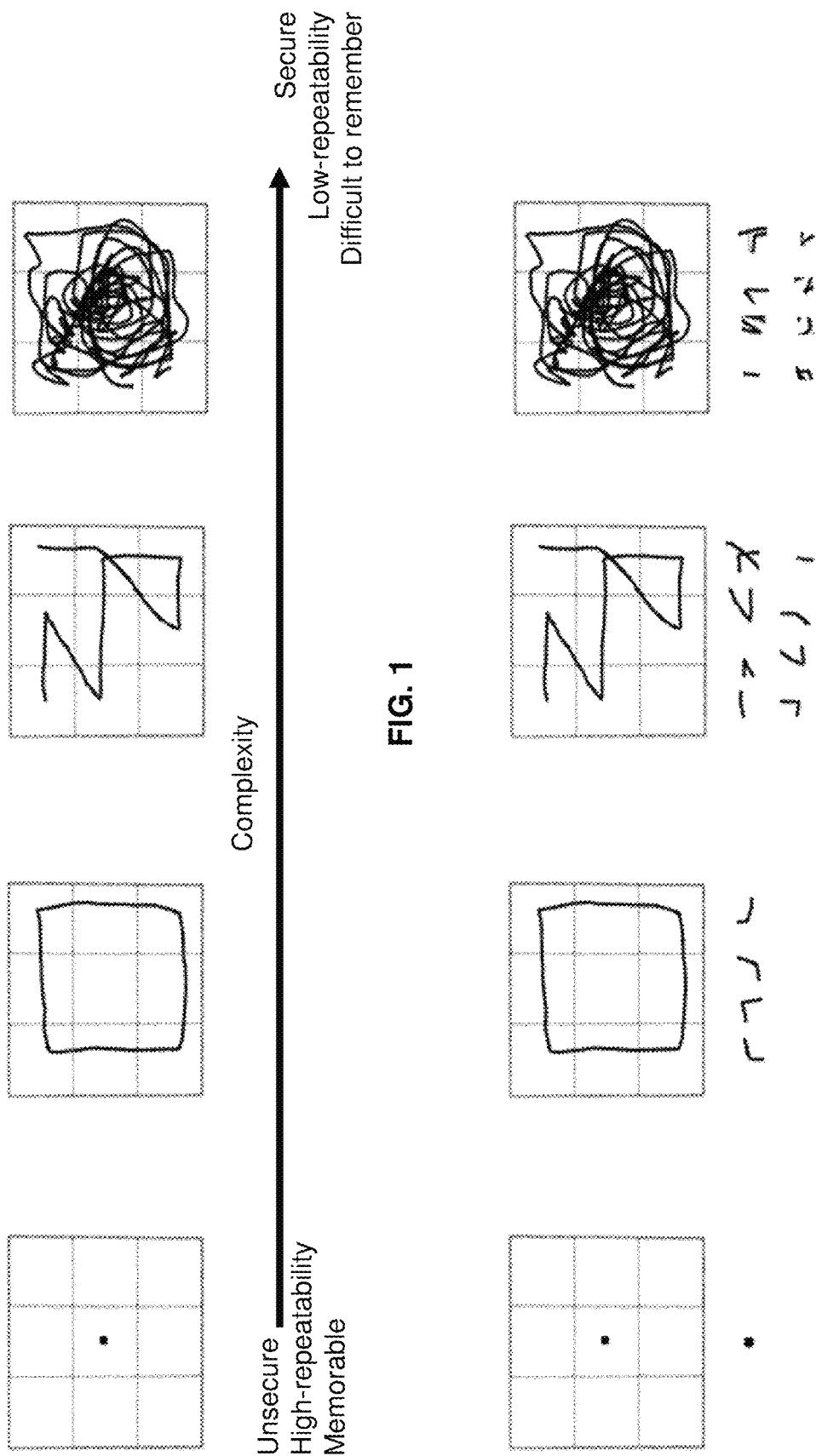

SECURE AUTHENTICATION TOKEN

CROSS-REFERENCE TO RELATED APPLICATIONS

This application is the U.S. national phase of International Application No. PCT/EP2023/054797 filed Feb. 27, 2023, which designated the U.S. and claims priority to GB 2204096.8 filed Mar. 23, 2022, the entire contents of each of which are hereby incorporated by reference.

FIELD

The present disclosure relates to a method for validating a secure authentication token.

BACKGROUND

Computers may control human user interfaces to create an Extended Reality (XR) environment in which some or all of the XR environment, as perceived by the user, is generated by the computer. These XR environments may be virtual reality (VR), augmented reality (AR), and/or mixed reality (MR) environments, in which some or all of an XR environment may be generated by computers using, in part, data that describes the environment. This data may describe, for example, virtual objects that may be rendered in a way that users sense or perceive as a part of a physical world and can interact with the virtual objects. The user may experience these virtual objects as a result of the data being rendered and presented through a user interface device, such as, for example, a head-mounted display device. The data may be displayed to the user to see or may control audio that is played for the user to hear, or it may control a tactile (or haptic) interface, enabling the user to experience touch sensations that the user senses or perceives as feeling the virtual object.

XR applications allow users to share and work in the same virtual environment. It offers cyber security analysts access to multiple security tools and, therefore, to sensitive data forcing the need to make sure only authorised personal can access and manage that data. Thus, there is a need to have a good method of authentication in XR environments to keep the environment safe and secure to use.

In XR environments, keyboards and mouses are not commonplace. Using XR devices occludes or even hides completely the real environment with virtual objects and scenarios. Therefore, it is surprisingly hard to find and use the mouse and keyboard, creating a frustrating experience and, in the end, the user prefers to remove the keyboard and mouse from the experience completely.

Interactions inside XR environments, e.g., Oculus Quest, may preferably be carried out using handheld motion controllers or wands, or more recently with vision-based hand tracking of your bare hands only. True hand tracking will let people be more expressive in VR and benefit from more natural forms of interaction. Hand tracking will also reduce the barriers of entry to VR for people who may not be familiar or comfortable with gaming controllers. Your hands are always with you and always on-you do not have to grab a controller, keep it charged, or pair it with the headset to jump into VR.

Basic systems using gestures for authentication purposes are known. It is however possible to copy a simple gesture password by observing the gestures of a user while using an access control application. There is thus a need for users to be able to create gesture passwords which are not easy to copy.

SUMMARY

According to a first aspect of the present disclosure, there is accordingly provided a method of validating a secure authentication token for accessing an application, the method comprising:

capturing a user gesture provided by a user as an authentication token;

analysing the gesture to evaluate a measure of complexity of the gesture; wherein, responsive to a determination that the measure of complexity does not meet a defined measure of complexity, repeating the capturing and analysing steps until the gesture meets the defined measure of complexity; and then requesting the user to repeat the approved gesture;

capturing a repeated gesture provided by the user;

determining if the repeated gesture meets defined requirements for repeatability;

wherein, responsive to a determination that the repeated gesture does not meet the requirements for repeatability, repeating the method; and responsive to a determination that the repeated gesture does meet the requirements for repeatability, validating the gesture as a secure authentication token.

First, the user-provided gesture is repetitively captured and analysed until it meets a measure of complexity, and then there is also a determining if the gesture is repeatable. The initial analysis of the captured gesture may determine if it is complex enough to not be easily copied and not too complex to remember or repeat. This analysis is preferably carried out by a computer program, so it is based on a digital analysis of the user-provided gesture. However, the present disclosure also comprises an extra determining by checking if the user actually can properly repeat the gesture before validating the gesture as a secure authentication token. Whereas the initial check analyses the measure of complexity of one gesture, the second check analyses the repeatability of multiple gestures which indirectly also is a measure of complexity. The more complex a gesture is, the harder it is to repeat. The method is a thus control mechanism to discourage or invalidate too complex gesture authentication tokens which are too hard to repeat.

Preferably, the requirements for repeatability comprise determining a measure of similarity between the repeated gesture and the approved gesture. By having the user repeat the gesture and then compare the similarity of the gestures, it is possible to determine how repeatable the gesture is. If the user is able achieve gestures which look similar, they could be deemed to be repeatable.

Preferably, the step of requesting the user to repeat the approved gesture comprises repeating it a predefined number of times. The more times the gesture is repeated by the user, the more the repeatability aspect is tested for authentication purposes. If the user is able to repeat their gesture several times, it means that the gesture is not too complex and that they will be more able to remember it. Preferably, all of the gestures repeated a predefined number of times are determined to fulfil a measure of similarity between the repeated gesture and the approved gesture. If the user is able to repeat their gesture, every time, a number of times, it also means that the gesture is not too complex and that they will be even more able to remember it.

Preferably, the defined requirements for repeatability comprise comparing the measure of complexity of the repeated gesture with the measure of complexity of the approved gesture. Gestures may be analysed with respect to measure of complexity in a variety of ways and by comparing how complex they are, it is possible to determine how similar they are and how repeatable the gesture accordingly is. If the respective measures of complexity are similar, it may be deemed that the gesture is not too complex and thus repeatable.

Preferably, the gesture comprises one or more gesture fragments. Preferably, the gesture also comprises at least one re-directional section, and some of the gesture fragments correspond to at least one or more parts of the re-directional section or to parts of the gesture that are adjacent to the re-directional section.

The gesture may be analysed as a whole gesture but it is preferred to look at the gesture as a series of joined sub-gestures, or as gesture fragments. The analysis becomes much more precise and fine-tuned if you can analyse and compare the respective parts. A gesture normally comprises several re-directional movements and it may be preferred to analyse gesture fragments that make up a distinct re-directional section or gesture fragments that are adjacent to re-directional points.

Preferably, the defined measure of complexity comprises a minimum measure of complexity, the method further comprising: determining and proposing amendment to the gesture to increase a measure of complexity of the gesture; and repeating the capturing and analysing steps until the gesture meets the minimum measure of complexity.

When a user is prompted to choose a gesture password as an authentication token, they will try out something but they will not know if it is secure enough. The method according to the present disclosure is advantageous for the user in helping them to understand how they can alter their gesture in order to increase a measure of complexity and consequently make it more secure and harder for a dishonourable person to copy it. It is also convenient for the user to not have to think of a different gesture password which hopefully is more complex, but they are instead guided in the process by being prompted to amend their suggested gesture password to increase the measure of complexity. This guiding process considerably speeds up the process of selecting a gesture password because the process can often be very frustrating and time-consuming, especially for older or less tech-savvy people.

Furthermore, straightforward gesture passwords, such as a name of a person or a place, or simple geometrical symbols, such as squares, circles or triangles, may be easy to identify for an onlooker, and, even if it is not possible to easily see all parts of the gesture strokes, they can potentially still derive the missing parts from the identified parts by guessing what the whole password may be. However, it is much more difficult for an onlooker to spot one or more changes that deviate from a user-suggested, straightforward gesture even if they can correctly assume what parts of it may be.

Preferably, the proposing of an amendment comprises proposing to add an additional gesture fragment so as to increase the measure of complexity of the gesture. Preferably, the proposing of an amendment comprises proposing to change at least one gesture fragment so as to increase the measure of complexity of the gesture.

There are at least two main ways to propose how to increase the measure of complexity of a gesture password. Gesture fragments can either be added to the user-suggested gesture or user-suggested fragments may be amended. The gesture comprises normally several user-suggested re-directional gesture fragments, and, by just adding another gesture fragment or just amending one of the gesture fragments, the measure of complexity increases, making it potentially secure and more difficult to copy. The user thus does not need to change the whole or most of the overall gesture but only a distinct section of it, which simplifies the amendment process for the user.

Preferably, the measure of complexity is evaluated based on an identification of one or more characteristics of the user provided gesture. Preferably, the identified characteristic comprise one or more of length, velocity, acceleration, re-direction segments or points, magnitude, zero-speed events, grid-volumes or grid-areas covered, total variation across axes, entropy, angles, and gesture overlap. Preferably, the proposing of an amendment to the user provided gesture comprises amending one or more of the identified characteristics so as to increase the measure of complexity.

There are thus multiple ways a user can be suggested to amend their gesture to make it more secure. By varying one or more of the aforementioned characteristics over the whole or parts of the gesture, the variable degree of measure of complexity of the gesture is endless. The method according to the present disclosure provides therefore a comprehensive manner in which to reach a secure password which is difficult for an onlooker to copy.

Preferably, the identified characteristics x are individually weighted w and a measure of complexity y is derived from the arithmetic mean of d characteristics as:

$$y = \frac{1}{d}\sum_{i=1}^{d} w_i x_i$$

wherein the minimum measure of complexity is determined based on the characteristics x used to evaluate the measure of complexity y.

Preferably, the measure of complexity is based upon at least a part of the gesture or upon some of the gesture fragments. Preferably, the defined requirements for repeatability requires a measure of similarity between the complexity factor y of the repeated gesture and the complexity factor y of the approved gesture.

The method according to the present disclosure becomes very versatile and measurable when the chosen characteristics together with respective weighting can be given a mean value according to the formula and compared to other gestures or gesture fragments, e.g., repeated gestures and gesture fragments. The present disclosure is not limited to using the above formula but can use any kind of formula that is suitable in order to identify and compare a measure of complexity and/or repeatability for gestures and gesture passwords.

The operator of the method of validating a secure authentication token for accessing an application thus has an advanced and very precise tool at hand. They can select among a large variety of characteristics and limit the analysis to very specific gesture fragments. This ensures a strong authentication system, yet user friendly when the user is guided to select a gesture password which is both secure and repeatable, i.e., not too difficult to remember.

Preferably, wherein responsive to a determination that the analysed gesture exceeds a defined maximum measure of complexity, the method further comprises determining and proposing amendment to the gesture to decrease a measure of complexity of the gesture, and repeating the requesting, capturing and analysing steps; and wherein the determination that the gesture meets the minimum measure of complexity further includes a determination that the gesture does not exceed the maximum measure of complexity.

Correspondingly, there is a defined maximum measure of complexity where the gesture is very secure but it is instead too complex, i.e., the gesture is deemed to be too difficult to remember or to repeat. The user is thus similarly prompted, as for unsecure gesture passwords, to amend their gesture, but to make it less complex to facilitate for the user to easier remember it. It is a common phenomenon that users choose an overly ambitious password that is too complex, because, even if they can remember it at the time of choosing, they are more likely to have forgotten it after some time has passed.

Preferably, the method further comprises comparing the captured gesture with gestures in a database comprising compromised or commonly used gestures; and responsive to a determination that the captured gesture meets a level of similarity to at least one of the gestures in the database, treating the captured gesture as not meeting the minimum measure of complexity. Preferably, the determination of similarity between the captured gesture and the gestures in the database is performed using machine learning techniques.

The machine learning technique may comprise an algorithm that is trained on gestures, or elements from that gesture input, for example the number of points of redirection or pauses within the gesture, to detect a similarity of the gesture to those stored in the database. The algorithm used may be a single technique or several applied together. Several techniques that might be applied include artificial neural networks, dynamic time warping, and decision tree classifiers. The similarity may be output as a continuous variable that is scored against a threshold to determine if the match is sufficient.

Preferably, the application is a virtual reality application, augmented reality application, mixed reality application, extended reality application or a 3D application.

When the user is using a XR system, there is a defined virtual environment space for them to be able to see their basic actions, for example their hand movements. Moreover, when providing a gesture for authentication, it is advantageous for the user to have a visual cue to be able to correctly carry it out.

According to a second aspect of the present disclosure, there is a provided a computer system including a processor and memory storing computer program code for performing the steps of the method set out above.

According to a third aspect of the present disclosure, there is a provided a computer program element comprising computer program code to, when loaded into a computer system and executed thereon, cause the computer to perform the steps of a method set out above.

BRIEF DESCRIPTION OF THE FIGURES

In order that the present disclosure may be better understood, examples thereof will now be described, by way of example only, with reference to the accompanying drawings in which:

FIG. 1 is an example of different gestures with increasing measure of complexity;

FIG. 2 shows the same gestures as in FIG. 1, together with extracted gesture fragments from said gestures;

DETAILED DESCRIPTION OF THE FIGURES

Figure 3:
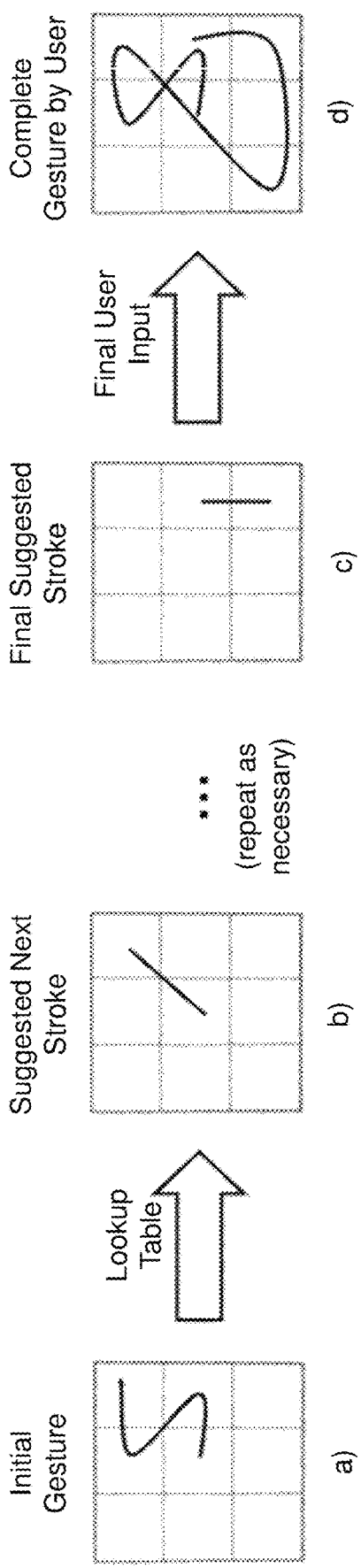
FIG. 3 is an example of the process of proposing additional gesture fragments to increase the measure of complexity of the gesture.

The following description is presented to enable any person skilled in the art to make and use the system and/or perform the method of the invention, and is provided in the context of a particular application. Various modifications to the disclosed embodiments will be readily apparent to those skilled in the art.

The method according to the present disclosure is preferably carried out in an XR environment with head-mounted displays, for example Oculus Quest or smart goggles, but it is also applicable to a conventional, camera-based capturing set-up in the real world, like Xbox Kinect. Newly developed interaction sensors using radar technology in for example the Google Soli project can track sub-millimetre motions of fingers at high speed and accuracy and are also advantageous, applicable applications. All these different systems are able to capture and track a user's gestures.

FIG. 1 shows different gestures and their trajectories with ever increasing measure of complexity. A gesture with low measure of complexity is unsecure, and thus easy to copy, but it is also easy to repeat and to remember. When the measure of complexity increases with more advanced gestures, the security increases as well, but the gesture becomes harder to repeat and is more difficult to remember, especially as time goes by. Therefore, a compromise is needed to find a secure gesture password which is repeatable. In FIG. 1, the first two gestures are too easy to copy and the last gesture is far too complex and may be impossible to both repeat and remember. The third gesture shows an example of a secure and repeatable gesture password.

FIG. 2 shows the same gestures as in FIG. 1, together with extracted gesture fragments from said gestures. The extracted gesture fragments can preferably by used to help identify measure of complexity and repeatability of the gestures. The gesture fragments are preferably selected from the portion of the gesture or gesture trajectory that start just before and end after a re-directional section, but a gesture fragment can also cover the portions between two re-directional points or a portion that is even longer and span over multiple re-directional sections. A re-directional section is defined as the adjacent parts preceding and following a re-directional point, and a re-directional point is the point where there is a substantially distinct change in direction of the gesture trajectory. The substantially distinct change could be defined with respect to pre-defined changes of the derivative of the gesture trajectory for any chosen mathematical axis.

When a user-provided gesture is provided and analysed according to the present disclosure, one or more identifying characteristics are determined that are associated with the gesture. The determined characteristics may for example be one or more of length, velocity, acceleration, re-direction segments or points, magnitude, zero-speed events, grid-volumes or grid-areas covered, total variation across axes, entropy, angles, and gesture overlap, but they may also be other similar, relevant characteristics.

The determined characteristics may be based upon the whole gesture or upon one or more gesture fragments. For example, they may be based upon the average velocity, acceleration or magnitude of the whole gesture or upon the average velocity, acceleration or magnitude of one or more of the gesture fragments. This yields an authentication system which is more advanced and sophisticated than merely basing it upon the whole gesture only. Zero-speed events can include pause points, when a gesture halts very shortly along the way, normally at a re-direction point. Zero-speed events comprises the number of them and the time length of them, individually and totally. Magnitude can refer to the main magnitude peaks of the velocity or the acceleration of the gesture, as a whole or for certain gesture fragments. Grid-volumes or grid-areas covered can mean how many of them that are passed through by the gesture in a defined 3D space or a defined 2D plane upon which the 3D gesture has been chosen to be projected, for example a vertical plane behind the user, parallel to the plane of the cameras. Total variation across axes can refer to how the gesture (or the velocity or acceleration) varies across x-, y- and z-axes or across any other applicable coordinate system, such as a spherical or a cylindrical coordinate system. Entropy can include a number of possible variations of an authentication factor, i.e., a measure of variation. If something has a low entropy, it may be easy to guess by random chance. A coin has lower entropy than a dice, for example. Thus, a more varied gesture will yield a higher entropy than a simpler gesture. Angles can refer to the angles for respective re-direction section. Each such section will define a plane and an angle for the gesture trajectory. Gesture overlap can mean simply the number of times the gesture trajectory crosses its own path. This could be applicable in the defined grid-volume but will yield many more overlaps in a 2D plane upon which the 3D gesture has been chosen to be projected.

Referring back to the third exemplary gesture in FIG. 1, and by way of a short example, an exemplary method according to the present disclosure may among other things have detected 6 re-direction segments and 6 re-direction points, 1 zero-speed event, 8 squares or grid-areas used, an average velocity of v and a length of l. This may for example correspond to a measure of complexity score of 60% and may meet a minimum measurement of complexity, which can be predefined or preselected. The minimum requirement is a minimum measure of complexity that a gesture must meet or exceed. However, for the fourth exemplary gesture in FIG. 1, it contains a high number of some of these characteristics and may thus be determined to be a very complex gesture that is excessively difficult or impossible to reliably repeat and remember. For completeness, the gestures in the first two examples may be found to lack sufficient measure of complexity, and as such will have a measure of complexity that does not meet the minimum requirement as a minimum measure of complexity.

In use, an exemplary authentication system according to examples of the present disclosure can employ a gesture tracking device or system to monitor and analyse a user's movements. The following scenario could potentially take place:

1. The user initiates an XR environment or simply positions themself in a starting position for the authentication system where the cameras or EM-radiating devices can view or reach their arms and hands and requests access to a high security resource or application and requires authentication.
2. Since the user has not yet enrolled into the system, they are requested to provide a gesture as an authentication token.
3. The user provides the gesture password with their arms and hands or by waving a motion-based controller.
4. The gesture provided by the user is captured by the gesture tracking device or system.
5. The gesture is analysed with suitable software in a computing device, in a purpose-built chip or in a chip-on-board, such as to determine one or more identifying characteristics associated with the gesture (for example length, magnitudes of velocity for certain gesture fragments, grid-volumes covered and respective angles at all re-direction points).
6. If the analysed gesture doesn't meet defined measure of complexity, an amendment to the user provided gesture is determined and proposed so as to achieve a gesture which meets the defined measure of complexity. For example, the proposal could be to add an additional gesture fragment or amend at least one gesture fragment so as to increase a measure of complexity of the gesture.
7. Repeating the previous method steps 3-6 with the user attempting to incorporate the proposed amendment until the gesture meets the defined measure of complexity.
8. The authentication system approves the gesture as a secure authentication token.
9. Optionally, if the analysed gesture exceeds a defined maximum measure of complexity, such as to be so complex that repeatability and reliability would be compromised, an amendment can be determined and proposed to the gesture to decrease a measure of complexity of the gesture, and then repeat the requesting, capturing and analysing steps. The determination that the gesture meets the minimum measure of complexity further includes a determination that the gesture does not exceed the maximum measure of complexity.
9. Optionally, external checks on the gesture password may be performed, for example against a database to check if it is secure enough. The gesture can be classified against a list of known/common or compromised gestures and, if it is too close to any such gesture in the database, it can be deemed to fail the minimum measure complexity requirements regardless of how complex the user-provided gesture. Optionally, the user can also be alerted that their password, even though it is complex, is potentially hackable.
10. The user is also requested to repeat the approved gesture, for example N times, and, if it is determined that the gesture doesn't meet defined requirements for repeatability, repeat all the previous method steps until the gesture meets the requirements; and then approve the gesture as a secure authentication token. This is to ensure that whilst the computer software believes the repeatability to be high, that the user can actually also repeat the gesture. If the match is below a lower, defined threshold, then the repeatability is proven low and the system returns to step 3. Further, if the user can repeat the gestures with high precision above an upper, defined threshold for N times, then the gesture may be enrolled as a valid authentication token for that user. Notably, threshold for repeatability can be provided by way of a comparison between iterations of gestures such as by determining a measure of similarity between iterations.
11. Finally, the user is requested to login, at which point they will enter their credentials and perform the gesture that has been approved.

Another example will be given to exemplify and accentuate further aspects of the present disclosure. With respect to determining the identified characteristics x, they may be individually weighted w—and, a complexity measure y is derived from the arithmetic mean of d characteristics as:

$$y = \frac{1}{d}\sum_{i=1}^{d} w_i x_i$$

FIG. 3 is an example of the process of proposing additional gesture fragments to increase the measure of complexity of the gesture. A user provides an initial gesture as a gesture password in FIG. 3a and the gesture is analysed to identify if it is complex. If it doesn't meet the defined measure complexity requirements, the system proposes to add a measure of complexity by adding an additional fragment, as seen in FIG. 3b. In the background, a lookup table with gesture fragments is preferably used to find a suitable next fragment that adds measure of complexity. The user is thus prompted to improve the measure of complexity and security of their gesture password by adding the new fragment. This process can be repeated several times until the proposed, final gesture fragment produces a gesture password that contains sufficient measure of complexity, see FIGS. 3c and 3d. When comparing FIGS. 3a and 3d, we can see how the measure of complexity of the gesture has increased due to being substantially longer, having three additional re-directional segments, having one more gesture overlap, covering three additional grid-areas (and potentially many more additional grid-volumes if it is a 3D-system), etc. Furthermore, there is also a potential increase of basically any other measured characteristic, if they are selected for analysis.

A lookup table may be a component that helps the system decide which is the optimal next recommended type of addition to the gesture password to properly increase the complexity. For example, if a user has input a long straight line, the system may for example take a representation of this straight line such that it can be looked up in the lookup table which may have a recommendation for a corner or a crossover element to be added to the gesture. The lookup table can be seen as a hash map in which an input, i.e., a part of a gesture, is used to compute the address in the lookup table such that if k is the part of the gesture, and h is the function to form the address, then h (k)=v where v is the value of the next suggested action for the gesture.

To exemplify a process of using weighting and the complexity measure, suppose the user provides a rather simple gesture and, when analysing the gesture fragments, the system finds three different features: "distance", "total variation across axes (dimensionality)" (XYZ will count as 1 each) and "zero-speed events". So, d=5.

The parameter w is configurable based on the requirements for the application, in this example it is defined as w_distance=0.8, w_dimensionality=1 and w_zero-speed_events=0.8. This allows us to ensure that dimensionality has the most impact on the overall value of y, which is chosen to be the most significant parameter for this application.

1. The total length of the user-generated gesture is 100 cm (x1=0.2 will represent the value of distance). This will trigger the system to suggest a longer gesture (individual threshold defined as 150 cm (x1=0.3)).
2. The magnitude of acceleration across the axes yields certain values:
   x2=0.9 (represents the value of the magnitude of the acceleration in the X-axis);
   x3=0.8 (represents the value of the magnitude of the acceleration in the Y-axis);
   x4=0.1 (represents the value of the magnitude of the acceleration in the Z-axis); so, this will trigger the system to suggest to the user to use the z-axis more (individual threshold defined as 0.5).
3. The user used a continuous gesture movement with no pauses (x5=0 will represent the value of zero-speed events). This will trigger the system to suggest at least one pause (individual threshold defined as x5=0.5).

Using the formula for y provides then (x1.w_distance+x2.w_dimensionality+x3.w_dimensionality+x4.w_dimensionality+x5.w_zero-speed_events)/5=((0.2× 0.8)+(0.9×1)+(0.8×1)+(0.1×1)+(0×0.8))/5=0.392. This result is below the average threshold for the measure of complexity score (using the individual thresholds above will result in an approved complexity measure of 0.568). This will indicate to the system that the password is not complex enough so amendments will accordingly be proposed to use a longer gesture, use more gesture depth with respect to the camera pointing direction (assuming that is the −axis) and use a small pause.

This process can be repeated until the gesture reaches an approved complexity measure y=0.568. The size of the complexity measure, or a relative percentage factor, are preferably given to the user throughout the process so that they can see or hear the effects of the gesture changes that they are gradually implementing. This encourages the user to keep progressing or experiment with different gesture changes or gesture characteristics and not give up because they have no idea how close they are to succeeding and can not appreciate the effects of their efforts.

The proposals to the user may be made one by one, or several at once and they may be made by visual suggestions on a screen of the gesture fragments, or via text instructions or be given as an audible read-out text. The instruction to use a pause can be indicated in the visual suggestion with a marker or it can be a general instruction to use a pause anywhere in the gesture. It can also give direct feedback to the user while carrying out the gesture fragments, for example encouraging the distance of the gesture motion to be extended, i.e., the user needs to keep doing movement while a displayed number decreases based on the required, remining length of the gesture fragment. Furthermore, it can preferably display colours in the path indicating to the user the changes in the speeds that the user must do and when, for example, in the beginning and the end of the gesture they are encouraged by a red colour to accelerate the movement, while in the middle they are encouraged by a blue colour to slow it down. The same could be done with different audio signals. It can similarly signal to the user when to, for example, change direction abruptly or increase the angles.

The respective thresholds are defined by the application/use case. The higher threshold, the more complex the gesture needs to be. If the owner or operator of the application really wants to have things secure and complex, a bigger threshold value will be set.

Figure 4:
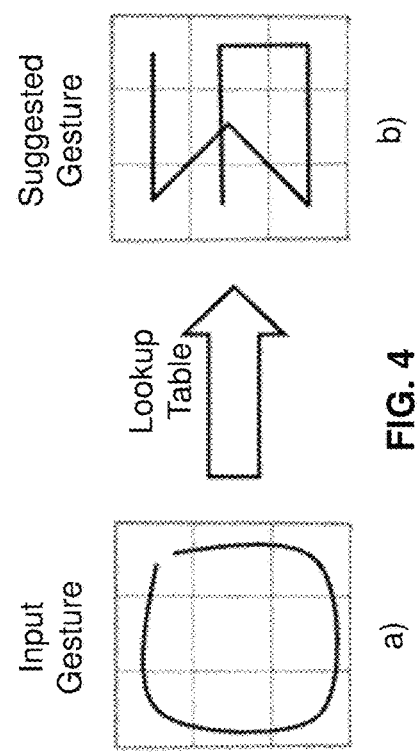
FIG. 4 is an example of amending a gesture to increase the measure of complexity of the gesture.

FIG. 4 is an example of amending a gesture to increase the measure of complexity of the gesture. A user completes a full gesture password which is not approved due to being unsecure. As in the previous example, they are subsequently presented with suggested changes to certain fragments, preferably via a lookup table, that will increase the measure of complexity of the gesture. The user will be prompted to redo their gesture using the suggested changes. These stages can be repeated as necessary until the gesture password contains enough measure of complexity.

In a similar fashion, if the gesture measure of complexity too complex, i.e., above a certain threshold, the measure of complexity might be deemed unsuitable for usability. At this point, the system may use the same process, for example of a lookup table to suggest changes to make the gesture less complex, but still complex enough to satisfy measure of complexity requirements.

Figure 5:
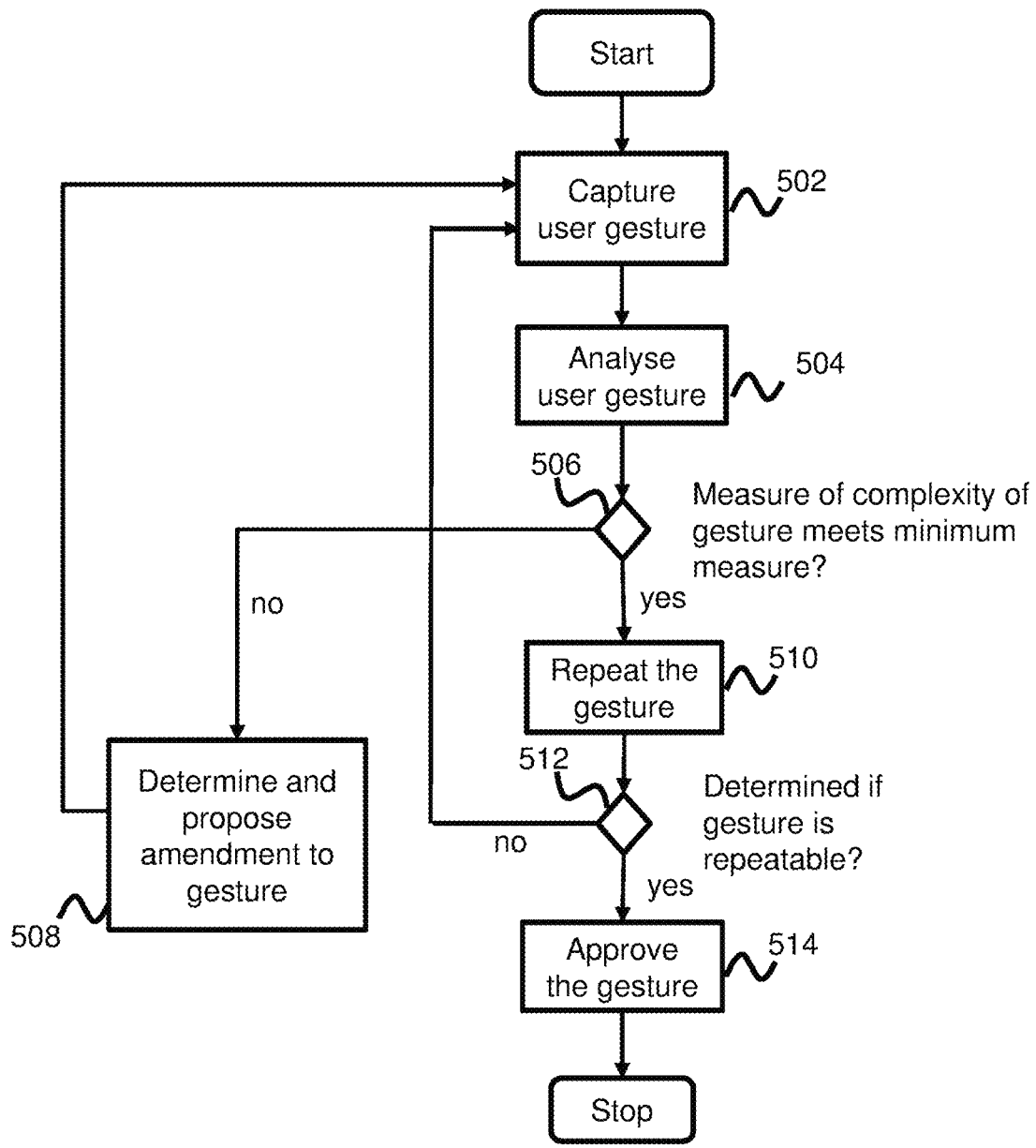
FIG. 5 is a flowchart of a method of validating a secure authentication token according to exemplary implementations of the disclosure.

FIG. 5 is a flowchart of a method of validating a secure authentication token according to exemplary implementations of the disclosure. Initially, at step 502, the method captures a user gesture provided by a user as an authentication token. At step 504 the method analyses the captured gesture to evaluate a measure of complexity of the gesture. At step 506 the method determines if the evaluated measure of complexity meets a minimum measure of complexity. Where the evaluated measure of complexity is determined not meet the minimum measure, the method determines and proposes amendment to the gesture to increase a measure of complexity of the gesture at step 508, and repeating steps 502, 504 and 506. If, at step 506, the method determines that the gesture does meet the minimum measure of complexity, the gesture is repeated at step 510. If, at step 512, the method determines that the gesture is not repeatable, steps 502, 504, 506 and 510 are repeated. If, at step 512, the method determines that the gesture is repeatable the method approves the gesture as a valid authentication token at step 514.

Embodiments of the invention will be apparent to those skilled in the art from consideration of the specification. It is intended that the specification be considered as exemplary only.

Where this application lists one or more method steps, the presence of precursor, follow-on and intervening method steps is not excluded unless such exclusion is explicitly indicated. Similarly, where this application lists one or more components of a device or system, the presence of additional components, whether separate or intervening, is not excluded unless such exclusion is explicitly indicated.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The scope of the present invention includes any novel features or combination of features disclosed herein. The applicant hereby gives notice that new claims may be formulated to such features or combination of features during prosecution of this application or of any further applications derived therefrom. In particular, with reference to the appended claims, features from dependent claims may be combined with those of the independent claims and features from respective independent claims may be combined in any appropriate manner and not merely in the specific combinations enumerated in the claims.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. Such a computer program may be embodied as source code or undergo compilation for implementation on a processing device, apparatus or system or may be embodied as object code, for example.

Such a computer program may be encoded as executable instructions embodied in a carrier medium, non-transitory computer-readable storage device and/or a memory device in machine or device readable form, for example in volatile memory, non-volatile memory, solid-state memory, magnetic memory such as disk or tape, optically or magneto-optically readable memory such as magnetic tape, compact disk (CD), digital versatile disk (DVD) or other media that are capable of storing code and/or data. Such a computer program may alternatively or additionally be supplied from a remote source embodied in a communications medium such as an electronic signal, radio frequency carrier wave or optical carrier wave. Such carrier media are also envisaged as aspects of the present invention.

Such instructions, when executed by a processor (or one or more computers, processors, and/or other devices) may cause the processor (the one or more computers, processors, and/or other devices) to perform at least a portion of the methods described herein.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, smartphones, tablets, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

The invention claimed is:

1. A method of validating a secure authentication token for accessing an application, the method comprising:
   capturing a user gesture provided by a user as an authentication token;
   analyzing the gesture to evaluate a measure of complexity of the gesture;
responsive to a determination that the measure of complexity does not meet a defined minimum measure of complexity,
   repeating the capturing and analyzing steps until the gesture meets the defined minimum measure of complexity;
responsive to a determination that the measure of complexity exceeds a defined maximum measure of complexity,
   determining and proposing amendment to the gesture to decrease the measure of complexity of the gesture, and
   repeating the capturing and analyzing steps until the gesture does not exceed the defined maximum measure of complexity; and then
   requesting the user to repeat the approved gesture;
   capturing a repeated gesture provided by the user;
   determining if the repeated gesture meets defined requirements for repeatability;
responsive to a determination that the repeated gesture does not meet the requirements for repeatability,
   repeating the method; and
responsive to a determination that the repeated gesture does meet the requirements for repeatability,
   validating the gesture as a secure authentication token.

2. The method of claim 1, wherein the requirements for repeatability comprise determining a measure of similarity between the repeated gesture and the approved gesture.

3. The method of claim 1, wherein the step of requesting the user to repeat the approved gesture comprises repeating it a predefined number of times.

4. The method of claim 3, wherein all of the gestures repeated a predefined number of times are determined to fulfil a measure of similarity between the repeated gesture and the approved gesture.

5. The method of claim 1, wherein the defined requirements for repeatability comprise comparing the measure of complexity of the repeated gesture with the measure of complexity of the approved gesture.

6. The method of claim 1, wherein the gesture comprises one or more gesture fragments.

7. The method of claim 6, wherein the gesture comprises at least one re-directional section, and some of the gesture fragments correspond to at least one or more parts of the re-directional section or to parts of the gesture that are adjacent to the re-directional section.

8. The method of claim 1, further comprising, responsive to the determination that the measure of complexity does not meet the defined minimum measure of complexity:
   determining and proposing amendment to the gesture to increase the measure of complexity of the gesture before repeating the capturing and analyzing steps.

9. The method of claim 8, wherein the proposing of an amendment to the gesture to increase the measure of complexity of the gesture comprises proposing to add an additional gesture fragment so as to increase the measure of complexity of the gesture.

10. The method of claim 8, wherein the proposing of an amendment to the gesture to increase the measure of complexity of the gesture comprises proposing to change at least one gesture fragment so as to increase the measure of complexity of the gesture.

11. The method of claim 1, wherein the measure of complexity is evaluated based on an identification of one or more characteristics of the user provided gesture.

12. The method of claim 11, wherein the one or more characteristics include one or more of length, velocity, acceleration, re-directional segments or points, magnitude, zero-speed events, grid-volumes or grid-areas covered, total variation across axes, entropy, angles, and gesture overlap.

13. The method of claim 11, wherein the proposing of an amendment to the user provided gesture to increase the measure of complexity of the gesture comprises amending one or more of the identified characteristics so as to increase the measure of complexity.

14. The method of claim 11, wherein the identified characteristics x are individually weighted w and a measure of complexity y is derived from the arithmetic mean of d characteristics as:

$$y = \frac{1}{d}\sum_{i=1}^{d} w_i x_i$$

wherein the measure of complexity is determined based on the characteristics x used to evaluate the measure of complexity y.

15. The method of claim 14, wherein the measure of complexity is based upon at least a part of the gesture or upon some of the gesture fragments.

16. The method of claim 14, wherein the defined requirements for repeatability requires a measure of similarity between the complexity factor y of the repeated gesture and the complexity factor y of the approved gesture.

17. The method of claim 1, further comprising:
   comparing the captured gesture with gestures in a database comprising compromised or commonly used gestures; and
   responsive to a determination that the captured gesture meets a level of similarity to at least one of the gestures in the database, treating the captured gesture as not meeting the minimum level of measure of complexity.

18. The method of claim 17, wherein the determination of similarity between the captured gesture and the gestures in the database is performed using machine learning techniques.

19. The method of claim 1, wherein the application is a virtual reality application, augmented reality application, mixed reality application, extended reality application or a 3D application.

20. A computer system for validating a secure authentication token for accessing an application, the computer system comprising: a processor and memory storing computer program code which is executable by the processor so that the computer system is at least configured to perform steps of a method including:
   capturing a user gesture provided by a user as an authentication token;
   analyzing the gesture to evaluate a measure of complexity of the gesture;
   responsive to a determination that the measure of complexity does not meet a defined minimum measure of complexity,
      repeating the capturing and analyzing steps until the gesture meets the defined minimum measure of complexity;
   responsive to a determination that the measure of complexity exceeds a defined maximum measure of complexity, determining and proposing amendment to the gesture to decrease the measure of complexity of the gesture, and repeating the capturing and analyzing steps until the gesture does not exceed the defined maximum measure of complexity; and then requesting the user to repeat the approved gesture;

capturing a repeated gesture provided by the user;

determining if the repeated gesture meets defined requirements for repeatability;

responsive to a determination that the repeated gesture does not meet the requirements for repeatability, repeating the method; and responsive to a determination that the repeated gesture does meet the requirements for repeatability, validating the gesture as a secure authentication token.

21. A non-transitory computer-readable storage medium storing computer program code to, when loaded into a computer system and executed thereon, cause the computer system to perform the steps of a method as claimed in claim 1.

* * * * *